United States Patent [19]
Acharya et al.

[11] Patent Number: 5,672,196
[45] Date of Patent: Sep. 30, 1997

[54] PROCESS AND APPARATUS FOR THE SEPARATION OF GASES

[75] Inventors: Divyanshu R. Acharya, Bridgewater; Satish S. Tamhankar, Scotch Plains, both of N.J.

[73] Assignee: The BOC Group, Inc., New Providence, N.J.

[21] Appl. No.: 510,115

[22] Filed: Aug. 1, 1995

[51] Int. Cl.$^6$ .................................................. B01D 53/04
[52] U.S. Cl. .......................... 95/97; 95/104; 95/122; 95/143; 96/130; 96/132; 96/144
[58] Field of Search .................................. 95/90, 95–106, 95/117–123, 143–148; 96/108, 121, 130–133, 144

[56] References Cited

U.S. PATENT DOCUMENTS

| | | | |
|---|---|---|---|
| 1,989,206 | 1/1935 | Magill | 96/108 |
| 2,080,578 | 5/1937 | Ray | 96/130 |
| 2,678,108 | 5/1954 | Reid | 96/133 |
| 3,925,041 | 12/1975 | Patterson et al. | 96/133 |
| 3,955,946 | 5/1976 | Fübring et al. | 96/130 X |
| 3,979,175 | 9/1976 | Kattan et al. | 95/104 X |
| 4,353,716 | 10/1982 | Rohde | 95/123 |
| 4,364,753 | 12/1982 | Wagner | 96/130 |
| 4,448,592 | 5/1984 | Linde | 96/130 X |
| 4,544,384 | 10/1985 | Metschl et al. | 96/130 |
| 4,950,311 | 8/1990 | White, Jr. | 95/98 |
| 5,071,449 | 12/1991 | Sircar | 96/130 X |
| 5,126,463 | 6/1992 | Ramachandran et al. | 549/262 |
| 5,169,413 | 12/1992 | Leavitt | 95/96 |
| 5,262,547 | 11/1993 | Ramachandran et al. | 549/262 |
| 5,278,319 | 1/1994 | Ramachandran et al. | 549/249 |
| 5,447,558 | 9/1995 | Acharya | 95/104 |

FOREIGN PATENT DOCUMENTS

| | | | |
|---|---|---|---|
| 0509638 | 10/1992 | European Pat. Off. | 96/121 |
| 0612553 | 8/1994 | European Pat. Off. | 96/108 |
| 1922992 | 11/1970 | Germany | 96/144 |
| 3431988 | 3/1986 | Germany | 95/143 |
| 4315578 | 11/1994 | Germany | 96/130 |
| 60-022918 | 2/1985 | Japan | 96/130 |
| 61-057218 | 3/1986 | Japan | 95/96 |
| 61-090721 | 5/1986 | Japan | 95/96 |
| 04-161215 | 6/1992 | Japan | 96/108 |
| 2135899 | 9/1984 | United Kingdom | 96/130 |
| WO94/29000 | 12/1994 | WIPO | 96/121 |

*Primary Examiner*—Robert Spitzer
*Attorney, Agent, or Firm*—Coleman R. Reap; Salvatore P. Pace

[57] ABSTRACT

Hydrocarbon gas is separated from a gas mixture by concentration swing adsorption in a system consisting of a pair of adjacent adsorption beds that are contained in a cylindrical vessel and separated by a flat partition wall. The system is operated with the beds out of phase, such that one bed is in adsorption service while the other bed is regenerated by purging the bed with air. The pressure and temperature in the bed undergoing adsorption does not differ from the pressure and temperature, respectively in the bed being regenerated sufficiently to create significant stresses in the partition separating the beds. In a modified version, the gas mixture and purge air are dried by simultaneously passing these gases through one pair of adjacent adsorption beds that are contained in a cylindrical vessel and separated by a flat partition wall with the respective pressures and temperatures in the two beds being substantially equal, while a substantially identical pair of adjacent adsorption beds are being regenerated by passing heated nonadsorbed gas from the hydrocarbon adsorption system through the beds at a substantially constant temperature and pressure.

32 Claims, 4 Drawing Sheets

5,672,196

PROCESS AND APPARATUS FOR THE SEPARATION OF GASES

FIELD OF THE INVENTION

This invention is directed to a process for separating gases by concentration swing adsorption, and more particularly to a process for separating gases in a pair of adjacent adsorption beds that are contained in a vessel and separated by a flat partition wall.

BACKGROUND OF THE INVENTION

Gas adsorption processes are frequently carried out in adsorption systems comprising two or more adsorption beds with each bed being contained in a separate cylindrical vessel, and with the system being cyclically operated in a manner such that one or more beds are in adsorption service while one or more other beds are being regenerated. Several factors influence the design of such a system. A principal factor to be considered in designing an adsorption system is the amount of space available for the various units of the system. The system generally requires sufficient space to place the adsorption vessels side by side, as well as the space necessary to include the auxiliary equipment, piping and valves that are associated with the system. In some plants there is not enough room to install a pair of adsorption vessels side by side. In vertical plant installations space can be saved by mounting one adsorption vessel on top of the other. Although this expedient saves ground space, it is more difficult to install and service the units of such a plant. The design of large plants with horizontal adsorption vessels is even more troublesome, since it is more difficult and expensive to mount horizontal adsorption vessels one above the other.

Another factor to be considered in designing an adsorption plant is equipment cost. The cost of the vessels used in an adsorption plant is a major expenditure. The use of several single-bed vessels significantly increases the cost of the installation.

In an effort to make adsorption plants more compact, multiple-bed adsorption vessels made by joining two or more individual vessels together in end-to-end fashion are used. Such unified vessels are constructed by welding the open end of a first vessel to the closed, convex end of a second vessel such that the closed end of the second vessel extends into the open end of the first vessel. If it is desired to fabricate a vessel having more than two adsorption chambers, this is accomplished by fastening the open end of a third vessel to the closed end of either the first or the second vessel. This technique conserves space in the plant and provides a unified vessel that has adsorption chambers with endwalls strong enough to withstand the significant stresses created when pressure swing adsorption (PSA) and temperature swing adsorption (TSA) processes are carried out in the vessels. However these vessels are still expensive since the internal walls of the vessels are convex.

The design of multiple chamber adsorption plants was further advanced by the incorporation of flat partitions into the fabrication of cylindrical vessels. This makes it possible to incorporate several adsorption beds into a single vessel. Such a design is illustrated in U.S. patent application Ser. No. 08/200,788, filed Feb. 22, 1994, now U.S. Pat. No. 5,447,558, by Acharya, one of the inventors in the present application. The adsorption process disclosed in this patent application is temperature swing adsorption.

The vessel design disclosed in the above U.S. patent application is attractive since vessels of such design can be easily and inexpensively fabricated, and they can be used in applications where space is at a premium. However, if it is intended to practice PSA or (TSA) processes in these vessels, the partition wall or walls separating adjacent adsorption beds must be of heavy construction and/or reinforced by support members, since considerable stress forces are exerted against the lateral surfaces of the partitions by the repeated pressure changes in pressure and temperature of these processes.

It would be highly desirable to be able to practice cyclic adsorption processes in adsorption plants comprised of cylindrical vessels that contain two or more adsorption chambers separated from each other by relatively thin gas-impermeable and gas-tight partitions. The present invention achieves this goal. This invention makes it possible to practice PSA processes and TSA processes in multiple-chamber, single-vessel adsorption systems in which the chambers are separated by relatively thin, unsupported partition walls.

SUMMARY OF THE INVENTION

The present invention accomplishes the goal of using cylindrical vessels that contain two or more adsorption chambers that are arranged longitudinally in the vessels and separated from one another by flat partitions that form gas-tight walls between adjacent chambers in adsorption processes by practicing the adsorption processes under conditions that create little or no stress on the partition walls of the vessels.

According to a first embodiment of the invention, a cyclic concentration swing adsorption (CSA) process for separating a first gas from a gas mixture containing the first gas and one or more other gases is carried out in a pair of adjacent adsorption chambers that are contained in a vessel. The adsorption chambers contain an adsorbent which selectively adsorbs the first gas, and they are separated by a planar partition, i.e. a flat partition that, in conjunction with the wall or walls of the vessel forms a gas-tight barrier between the adsorption chambers. The process is carried out by repeatedly performing in sequence the steps: (a) passing the gaseous mixture through the first adsorption chamber at a pressure in the range of about 1.05 to about 20 bara and a temperature in the range of about −50° to about 150° C., thereby adsorbing the first gas from the gas mixture and producing a first gas-depleted nonadsorbed stream, while simultaneously passing a purge gas through the second adsorption chamber at a pressure in the range of less than about 1.05 to about 20 bara and a temperature in the range of about −50° to about 150° C., thereby desorbing a first gas-enriched stream from the adsorbent contained in the other bed, and (b) passing the gaseous mixture through the second adsorption chamber at a pressure in the range of about 1.05 to about 20 bara and a temperature in the range of about −50° to about 150° C., thereby adsorbing the first gas from the gas mixture and producing a first gas-depleted nonadsorbed stream, while simultaneously passing a purge gas through the first adsorption chamber at a pressure in the range of less than about 1.05 to about 20 bara and a temperature in the range of about −50° to about 150° C., thereby desorbing a first gas-enriched stream from the adsorbent contained in the other bed. The adsorption chamber pressure differential is at all times maintained below the value at which stress failure occurs.

The adsorption phase of the process of this embodiment is preferably carried out at a pressure in the range of about 1.05 to about 1.75 bara, and the temperature at which the adsorption is preferably carried out is in the range of about 0° to about 60° C. The bed regeneration phase of this embodiment is preferably carried out at a pressure in the range of about 0.55 to about 1.75 bara and a temperature in the range of about 0° to about 80° C. The adsorption chamber pressure differential is desirably not permitted to exceed about 0.5 bar, and is preferably not permitted to exceed about 0.25 bar, and the adsorption chamber temperature differential is desirably not permitted to exceed about 25° C., and is preferably not permitted to exceed about 10° C.

The adsorption vessel is preferably cylindrical in shape. Also, the pair of adsorption chambers are preferably longitudinally disposed in the cylindrical vessel. Most preferably, the planar partition separating the adsorption chambers is perpendicular to the longitudinal axis of the cylindrical vessel and forms a continuous gas-tight seal with the sidewall of the cylindrical vessel.

In one aspect of the first embodiment, the gas mixture passes upwardly through the first adsorption chamber while the purge gas passes downwardly through the second adsorption chamber during step (a) and the gas mixture passes upwardly through second adsorption chamber while the purge gas passes downwardly through the first adsorption chamber during step (b).

In another aspect of the first embodiment, the gas mixture passes downwardly through the first adsorption chamber while the purge gas passes upwardly through the second adsorption chamber during step (a) and the gas mixture passes downwardly through the second adsorption chamber while the purge gas passes upwardly through the first adsorption chamber during step (b).

In a preferred version of either of the above aspects, the cylindrical vessel is positioned vertically in the plant. In another preferred version of either of these aspects, the cylindrical vessel is positioned horizontally in the plant.

In a more preferred variation of the version in which the cylindrical vessel is positioned horizontally, the sides of the adsorption chambers opposite the sides at which the planar partition is situated are sealed from the ends of the vessel by outer planar partitions that are disposed in planes parallel to the plane in which the partition that separates the adsorption chambers is disposed. In this more preferred variation, the desorbed gas is collected in one or both of the compartments that lie between the vessel endwalls and the outer partitions.

The process of the above-described embodiment is well suited for the recovery of a hydrocarbon from a gas mixture by adsorption of the hydrocarbon from the gas mixture. It is ideal to use the hydrocarbon recovery process in connection with partial oxidation processes in which a hydrocarbon and oxygen are reacted to form a desired partial oxidation product. In such cases the hydrocarbon can be purged from the adsorbent with an oxygen-containing gas, such as air or oxygen-enriched air, and the hydrocarbon-oxygen-containing gas mixture recycled to the partial oxidation reactor. In such cases the oxygen-containing gas is preferably air.

In another aspect of the hydrocarbon separation embodiment, the air and hydrocarbon-containing gas are dried by simultaneously passing these gases through adjacent gas-drying chambers that contain a moisture-selective adsorbent and that are longitudinally disposed in a cylindrical vessel and separated by a planer partition which forms a gas-tight seal with the sidewall of the cylindrical vessel. The gas drying step is carried out under conditions such that the pressure and temperature in one gas drying chamber does not vary from the pressure and temperature in the other drying chamber by more than 0.5 bar and 25° C., respectively.

The gas drying process is preferably a TSA process with the moisture-selective adsorbent in the adjacent gas drying chambers being regenerated by passing heated hydrocarbon-depleted gas from the hydrocarbon adsorption chamber through the moisture-selective adsorbent under conditions such that the pressure and temperature in one gas drying chamber do not vary from the pressure and temperature in the other drying chamber by more than 0.5 bar and 25° C., respectively. In a more preferred procedure for this aspect of the invention, the gas drying is carried out by TSA in two pairs of adjacent gas drying chambers, wherein the adsorbent in one pair is in service drying air and hydrocarbon-containing gas while the adsorbent in the other pair is undergoing regeneration.

According to a second embodiment, a cyclic adsorption process for simultaneously separating a first gas from a first gas mixture in a first adsorption chamber which contains an adsorbent which selectively adsorbs said first gas from said first gas mixture, and a second gas from a second gas mixture in a second adsorption chamber which contains an adsorbent which selectively adsorbs said second gas from said second gas mixture is carried out in a pair of adsorption chambers that are disposed longitudinally relative to each other in a cylindrical vessel and which are separated by a planar partition which, in conjunction with the cylindrical sidewall of the vessel forms a gas-tight barrier between the adsorption chambers. The process comprises repeatedly performing in sequence the steps: (a) passing the first gas mixture through a first adsorption chamber at a pressure in the range of about 1.05 to about 20 bara and at a temperature in the range of about −50° to about 150° C., thereby adsorbing the first gas and producing a first gas-depleted nonadsorbed gas stream, while simultaneously passing the second gas mixture through a second adsorption chamber at a pressure in the range of about 1.05 to about 20 bara and a temperature in the range of about −50° to about 150° C., thereby adsorbing the second gas and producing a second gas-depleted nonadsorbed gas stream; and (b) regenerating the adsorbent in the first and second adsorption chambers by passing a purge gas through said chambers at a pressure substantially the same as the pressure at which step (a) is carried out, or by simultaneously reducing the pressure in the first and second adsorption chambers or by simultaneously increasing the temperature in the first and second adsorption chambers, or by a combination of these procedures, thereby desorbing first gas from the adsorbent in the first adsorption chamber and producing a first gas-enriched gas stream, and simultaneously desorbing second gas from the adsorbent in said second adsorption chamber and producing a second gas-enriched gas stream. The adsorption chamber differential pressure is at all times during the process maintained below the value at which stress failure occurs.

In this second embodiment, the adsorption pressure in each adsorption chamber is preferably maintained in the range of about 1.05 to about 1.75 bara, and the adsorption chamber pressure differential preferably is not permitted to exceed about 0.5 bar. Also the adsorption temperature in each adsorption chamber is preferably in the range of about 0° to about 60° C., and the adsorption chamber differential temperature does not exceed about 25° C., and most preferably does not exceed about 10° C.

In one preferred aspect of this embodiment, the cylindrical vessel is vertically disposed, and in another preferred aspect it is horizontally disposed.

In one aspect of the second embodiment the ends of the first and second adsorption chambers opposite said first planar partition are sealed from the ends of said vessel by second and third planar partitions disposed in planes parallel to the plane in which said first planar partition is disposed. In this aspect, first gas-enriched gas is collected in a compartment that is at least partially formed by the end wall of said cylindrical vessel and the first planar partition and second gas-enriched gas is collected in a compartment that is at least partially formed by the end wall of said cylindrical vessel and the third planar partition.

In a preferred aspect of this embodiment, the first gas mixture and the second gas mixture are substantially identical.

Another embodiment of the invention relates to apparatus for separating a strongly adsorbed gas from a weakly adsorbed gas comprising:

(a) a horizontally disposed elongate vessel having a cylindrical sidewall and convex endwalls;

(b) first, second and third planar, circular, gas impermeable partitions positioned within the vessel perpendicularly to the longitudinal axis of the vessel, the perimeters of the partitions being in continuous gas-tight engagement with the side wall, said first and third partitions being proximate opposite ends of the sidewall and the second partition being positioned intermediate the first and third partitions, such that a first right circular cylindrical chamber is formed between the first and second partitions, a second right circular cylindrical chamber is formed between the second and third partitions, a first product gas buffer compartment is formed between the first partition and one of said convex endwalls, and a second product gas buffer compartment is formed between the third partition and the other convex endwall;

(c) first conduit means passing through the sidewall and providing fluid communication between a source of feed gas, the first and second cylindrical chambers and the first and second product gas buffer compartments;

(d) second conduit means passing through the sidewall at a point diametrically opposite the point at which the first conduit passes through the sidewall, and providing fluid communication between the first and second cylindrical chambers, a waste gas disposal means and a source of purge gas;

(e) third conduit means providing fluid communication between the first and second gas product buffers and product gas discharge means;

(f) valve means in the first conduit means for selectively directing the flow of feed gas to the first and second chambers and for selectively directing the flow of product gas to the first and second product gas buffer compartments; and (g) valve means in the second conduit means for selectively directing the flow of nonadsorbed gas from said first and second chambers to the waste gas disposal means and for selectively directing the flow of purge gas to the first and second chambers.

Another embodiment of the invention relates to apparatus for separating a strongly adsorbed gas from a weakly adsorbed gas comprising:

(a) a horizontally disposed elongate vessel having a cylindrical sidewall and convex endwalls;

(b) first, second and third planar, circular, gas impermeable partitions positioned within the vessel perpendicularly to the longitudinal axis of the vessel, the perimeters of the partitions being in continuous gas-tight engagement with the side wall, the first and third partitions being proximate opposite ends of the sidewall and the second partition being positioned intermediate the first and third partitions, such that a first right circular cylindrical chamber is formed between the first and second partitions, a second right circular cylindrical chamber is formed between the second and third partitions, a first product gas buffer compartment is formed between the first partition and one of the convex endwalls, and a second product gas buffer compartment is formed between the third partition and the other of the convex endwalls;

(c) first conduit means passing through the sidewall and connecting the first cylindrical chamber with a source of a first feed gas and the first product gas buffer compartment;

(d) second conduit means passing through the sidewall and connecting the second cylindrical chamber with a source of second feed gas and the second product gas buffer compartment;

(e) third conduit means passing through the sidewall at a point diametrically opposite the point at which the first conduit means passes through the sidewall, and connecting the first cylindrical chamber with a first gas discharge conduit and a source of first purge gas;

(f) fourth conduit means passing through the sidewall at a point diametrically opposite the point at which the second conduit passes through the sidewall, and connecting the second cylindrical chamber with a second gas discharge conduit and a source of second purge gas;

(g) conduit means connecting the first and second gas product buffers with product gas discharge means;

(h) valve means associated with the first conduit means for selectively providing fluid communication between the first cylindrical chamber and either the source of first feed gas or the first product gas buffer compartment;

(h) valve means associated with the second conduit means for selectively providing fluid communication between the second cylindrical chamber and either the source of second feed gas or second product gas buffer compartment;

(i) valve means associated with the third conduit means for selectively providing fluid communication between the first cylindrical chamber and either the first gas discharge conduit or the source of first purge gas; and (j) valve means associated with the fourth conduit means for selectively providing fluid communication between the second cylindrical chamber and either the second gas discharge conduit or the source of second purge gas.

BRIEF DESCRIPTION OF THE DRAWINGS

The same reference numerals are used to represent the same or similar parts in the various drawings.

DETAILED DESCRIPTION OF THE INVENTION

Figure 1:
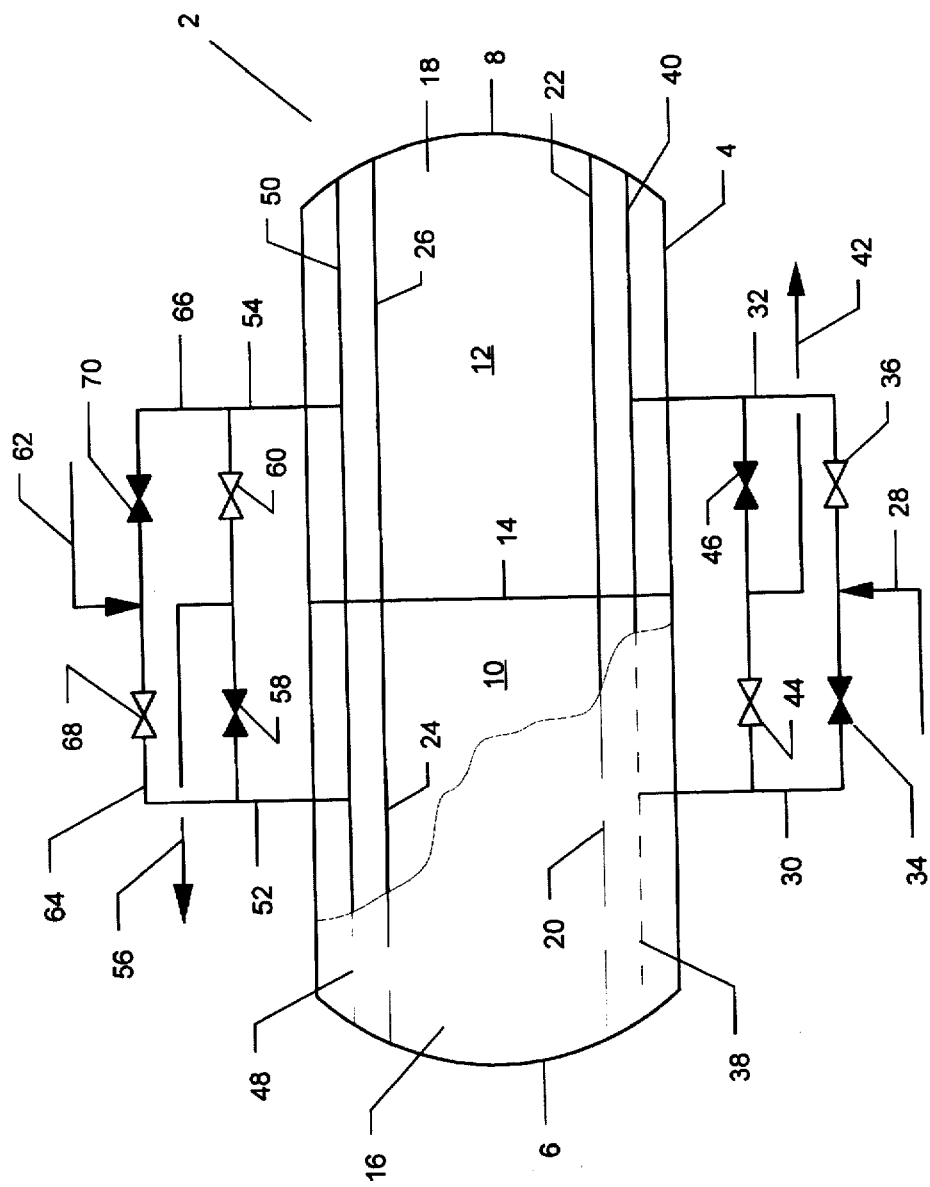
FIG. 1 illustrates a two-chamber adsorption vessel in which one embodiment of the process of the invention can be carried out.

The process of the invention is a cyclic adsorption process, and it is carried out in one or more pairs of adsorption chambers that are arranged adjacent to each other in a vessel and which are separated from each other by a flat partition wall. The flat wall is positioned such that, in combination with the vessel sidewall or sidewalls, it forms a gas-tight seal between the adjacent adsorption chambers, so that adsorptive gas purifications can be carried out simultaneously in each of the adsorption chambers. The chambers are preferably arranged in an elongate vessel, which is preferably cylindrical in shape, with the partition wall that separates the chambers being perpendicular to the longitudinal axis of the vessel. The partition wall separating the two adjacent adsorption chambers is fastened to the sidewall or sidewalls of the vessel in which the adsorption chambers are housed by means of a weld or other fastening means. The partition and the partition-vessel wall fastening means are designed to withstand a given force.

When used in reference to two adjacent adsorption chambers, the term "adsorption chamber pressure differential" means the absolute difference between the pressures in the two adjacent adsorption chambers at any given time, and the term "adsorption chamber temperature differential" means the absolute difference between the temperatures in the two adjacent adsorption chambers at any given time. The adsorption chamber pressure differential directly affects the force exerted against the partition. Increasing the adsorption chamber pressure differential causes an increase in the force exerted against the partition, and this, in turn, causes an increase in the force exerted against the partition-wall fastening means. As the adsorption chamber pressure differential at any given temperature increases, a point is eventually reached at which stress failure occurs. "Stress failure" means that the partition or the partition-sidewall fastening means develops one or more cracks or begins to rupture or otherwise become so defective that further use of the apparatus as an adsorption unit is impossible, inefficient or unsafe.

The adsorption chamber pressure differential may be zero, or it may be greater than zero, but it must not be so great that stress failure occurs. The actual point at which stress failure occurs depends upon, inter alia, the adsorption chamber pressure differential, the temperatures at which the process or each step of the process is carried out, the material from which the partition wall is constructed and the thickness of the partition wall. The adsorption chamber pressure differential, at all times during the adsorption process, is desirably not in excess of about 0.5 bar, and is preferably not in excess of about 0.25 bar. If this differential is always maintained below the critical value, stresses on the partition separating the beds will be minimal and the partition can be very thin and of low structural strength. This provides the advantage that the cost of constructing the vessels housing the adjacent adsorption chambers will be minimized.

The adsorption chamber temperature differential is of importance because it directly affects the adsorption chamber pressure differential since the pressure of a gas in a closed space is directly proportional to the absolute temperature of the gas. The temperature chamber temperature differential is also of importance, however, since it affects the efficiency of the adsorption process being practiced in the two-chamber apparatus of the invention. The effectiveness of an adsorption process depends, to a considerable extent, on the temperature at which the adsorption and bed regeneration steps are carried out. In general, the lower the adsorption temperature the more effective the adsorption of gases, and the higher the bed regeneration temperature the more effective the desorption of gases from the adsorbent. Since heat is quickly transferred through the wall separating the two adjacent adsorption chambers of the apparatus, the temperature in one chamber can rapidly affect the temperature in the adjacent chamber. This can have a dramatic effect on the overall efficiency of the adsorption process, particularly if the adjacent vessels are being used in a TSA process in which the two chambers are operated out of phase, with the adsorbent in one chamber being in adsorption service while the adsorbent in the adjacent chamber is undergoing bed regeneration. To ensure that the adsorption process(s) being carried out in the apparatus described in detail below is (are) practiced efficiently, the adsorption chamber temperature differential, at all times during the adsorption process is desirably not permitted to exceed about 25° C. and is preferably not permitted to exceed of about 10° C.

The same adsorptive separation can be carried out in each of the adjacent adsorption chambers, or one adsorptive separation can be carried out in one chamber while an entirely different adsorptive separation is carried out in the adjacent chamber. Subject to the pressure and temperature constraints specified above, the cyclic adsorptive separation or separations can be by PSA, TSA, CSA or combinations of these, provided that it is simultaneously carried out in both of the adjacent adsorption chambers. Additionally the same gas can be separated from two different gases in the two chambers, or one gas can be separated from a gas mixture in a first gas chamber, and, in the other chamber, a different gas can be separated from the same gas mixture or the residue of the gas mixture after it has passed through the first gas chamber.

The same step of the adsorption cycle, e.g. adsorption or bed regeneration, can be carried out simultaneously in each of the two chambers, or adsorption can be carried out in one chamber while bed regeneration is carried out in the other chamber. However, the latter procedure is not recommended for TSA processes, since efficient TSA processes require that the adsorption chamber temperature differential be greater than the maximum recommended above.

In a specific embodiment of the invention the process is used to recover a hydrocarbon from a waste gas stream from a partial oxidation reactor. In such a process a gaseous hydrocarbon is reacted with an oxygen-containing gas in the presence of an appropriate catalyst to produce a gaseous product stream containing a desired petrochemical, unreacted hydrocarbon and moisture; the petrochemical is separated from the gaseous product stream; unreacted hydrocarbon is adsorbed from the remaining gaseous product stream by adsorption; and the separated hydrocarbon is desorbed from the adsorbent and recycled to the partial oxidation reactor. Typical of such processes are those used to manufacture cyclic anhydrides, such as maleic anhydride; alkylene oxides, such as ethylene oxide; aldehydes, such as acetaldehyde; nitriles, such as acrylonitrile; and chlorinated hydrocarbons, such as vinyl chloride. The details of such partial oxidation reaction-based processes are well known and form no part of the present invention. These processes are described in detail in U.S. Pat. Nos. 5,126,463, 5,262, 547, and 5,278,319, the specifications of which are incorporated herein by reference.

The petrochemical manufacturing processes in which the subject invention can be beneficially used are those in which some or all of the oxygen-containing gas that is used in the partial oxidation reaction is introduced into the system in the hydrocarbon recovery section of the plant as a purge gas to purge unreacted hydrocarbon from the adsorbent. The oxygen-containing gas may be air or oxygen-enriched air. By oxygen-enriched air is meant air that contains more oxygen than is naturally present in air. Oxygen-enriched air can be prepared, for example, by adding oxygen to ambient air. Supplemental oxygen-containing gas may be supplied directly to the reactor, if desired. Air is the preferred oxygen-containing gas, since it is inexpensive and readily available. For ease of description, the oxygen-containing gas used in the process of the invention may frequently be referred to as air.

The invention can be better understood from the accompanying drawings. Auxiliary equipment, including valves, compressors and heat exchangers, that is unnecessary for an understanding of the invention have been omitted from the drawings to simplify discussion of the invention.

Considering first FIG. 1, depicted therein is horizontally disposed cylindrical adsorption vessel 2, having a sidewall 4 and endwalls 6 and 8. Located inside vessel 2 are first and second adsorption chambers 10 and 12, which are separated by partition wall 14. Partition 14 is substantially flat and circular in configuration, and it forms a continuous seal with sidewall 4 of vessel 2 such that chambers 10 and 12 are separate gas-tight compartments. Positioned in chambers 10 and 12 are adsorption beds 16 and 18, respectively. Beds 16 and 18 are supported at their lower sides by substantially flat, rigid screens 20 and 22, respectively, and the beds are held in place on their upper sides by optional substantially flat screens 24 and 26, respectively. On the feed side of vessel 2, i.e. the lower side of the vessel, feed gas line 28 communicates with lines 30 and 32 through valves 34 and 36, respectively. Lines 30 and 32 are connected to gas distributors 38 and 40, which are respectively located in the lower part of chambers 10 and 12 and designed to provide uniform distribution of feed gas to adsorption beds 16 and 18, respectively. Also located on the feed side of vessel 2 is desorbed product gas discharge line 42, which can be put into communication with lines 30 and 32 by means of valves 44 and 46, respectively. Located in the top part of chambers 10 and 12, above beds 16 and 18, are gas distributors 48 and 50, respectively. Line 52, joined to distributor 48, and line 54, joined to distributor 50, are connected to nonadsorbed gas product line 56 by means of valves 58 and 60, respectively. Also located on the top side of vessel 2 is purge gas supply line 62, which communicates with line 52 through line 64 and valve 68, and with line 54 through line 66 and valve 70.

Figure 2:
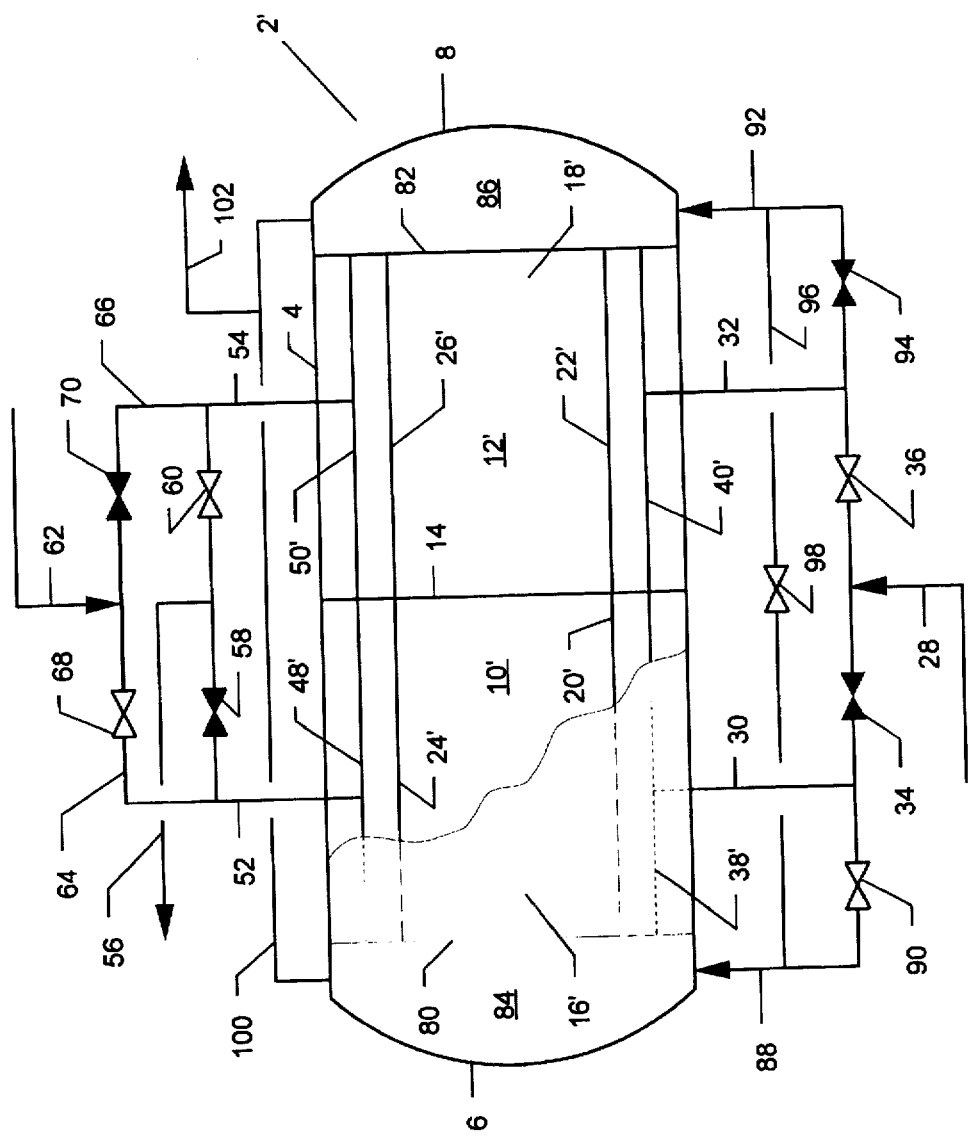
FIG. 2 illustrates a variation of the two chamber adsorption vessel of FIG. 1.

Considering next FIG. 2, illustrated therein is a modified version of the apparatus of FIG. 1. In the FIG. 2 embodiment, vessel 2' is provided with two additional partition walls, 80 and 82, each lying in planes parallel to the plane in which partition 14 lies, and each of which forms a continuous seal with side wall 4. Chambers 10' and 12' are in the form of right circular cylinders whose bases are partitions 14 and 80 and 14 and 82 respectively, and whose sidewalls are segments of sidewall 4. Beds 16' and 18' are substantially the same as beds 16 and 18 of FIG. 1, except that they are truncated by partitions 80 and 82, respectively. Likewise screens 20' and 24' and distributors 38' and 48' are substantially the same as screens 20 and 24 and distributors 38 and 48, respectively, except that they are truncated by partition 80; and screens 22' and 26' and distributors 40' and 50' are substantially the same as screens 22 and 26 and distributors 40 and 50, respectively, except that they are truncated by partition 82. Compartment 84 is defined by endwall 6, partition 80, and the segment of sidewall 4 lying between endwall 6 and partition 80, and compartment 86 is defined by endwall 8, partition 82 and the segment of sidewall 4 lying between endwall 8 and partition 82. Although partitions 80 and 82 are illustrated as joining sidewall 4 a short distance before the terminal ends of the sidewall, this distance is not critical, and in fact, partitions 80 and 82 can join sidewall 4 at the point where the sidewall itself is joined to endwalls 6 and 8, respectively. On the feed side of the apparatus of FIG. 2, line 88, provided with valve 90, provides fluid communication between line 30 and compartment 84, and line 92, provided with valve 94, provides fluid communication between line 32 and compartment 86. Cross connection line 96, provided with valve 98, connects line 88 to line 92. On the upper side of the FIG. 2 apparatus, line 100 provides fluid communication between compartments 84 and 86. Line 100 is also connected to desorbed product discharge line 102.

The adsorption apparatus of FIG. 2 has advantages over the apparatus of FIG. 1. For example, the flow of gas through beds 16' and 18' of the FIG. 2 apparatus will be more uniform than the flow of gas through beds 16 and 18 of the FIG. 1 apparatus, since partitions 14, 80 and 82 are parallel to the direction of flow of gases through vessel 2' of FIG. 2. A second advantage of the FIG. 2 apparatus is that compartments 84 and 86 serve as desorbed product gas buffers to temporarily store desorbed gas, thereby providing a more constant flow of desorbed gas to downstream applications.

Figure 3:
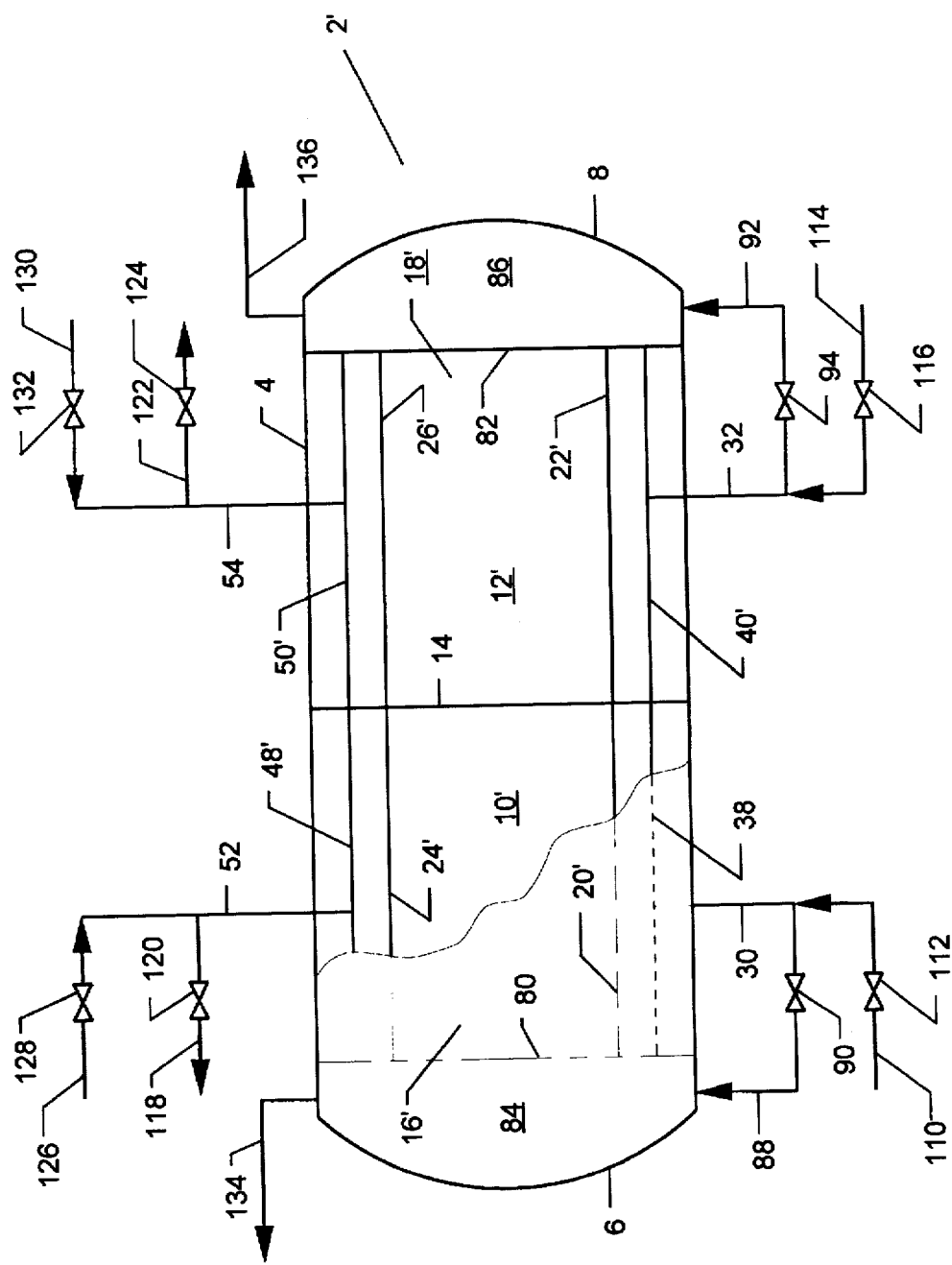
FIG. 3 illustrates a variation of the two chamber adsorption vessel of FIG. 1 in which two different feed gases can be separately and simultaneously introduced into the two chambers.

The apparatus of FIG. 3 is a variation of that of FIG. 2. The FIG. 3 apparatus is designed particularly to separate components of two different gas mixtures, although it can also be used to separate components of a single gas mixture. The principal differences between the apparatus of FIG. 2 and that of FIG. 3 are that the adsorption chambers of the FIG. 2 apparatus are connected to a common feed gas source and they have common discharge product gas lines, whereas the adsorption chambers of the FIG. 3 apparatus have independent feed lines and independent product gas discharge lines. On the feed side of the apparatus of FIG. 3, feed line 110, provided with valve 112, is connected to line 30, and feed line 114, provided with valve 116, is connected to line 32. On the upper side of vessel 2', line 52 is connected to nonadsorbed gas discharge line 118, which is provided with valve 120, and line 54 is connected to nonadsorbed gas discharge line 122, which is provided with valve 124. Purge gas supply line 126, fitted with valve 128, is also connected to line 52, and purge gas supply line 130, fitted with valve 132, is also connected to line 54. Desorbed product gas line 134 is connected to buffer compartment 84, and desorbed product gas line 136 is connected to buffer compartment 86.

Figure 4:
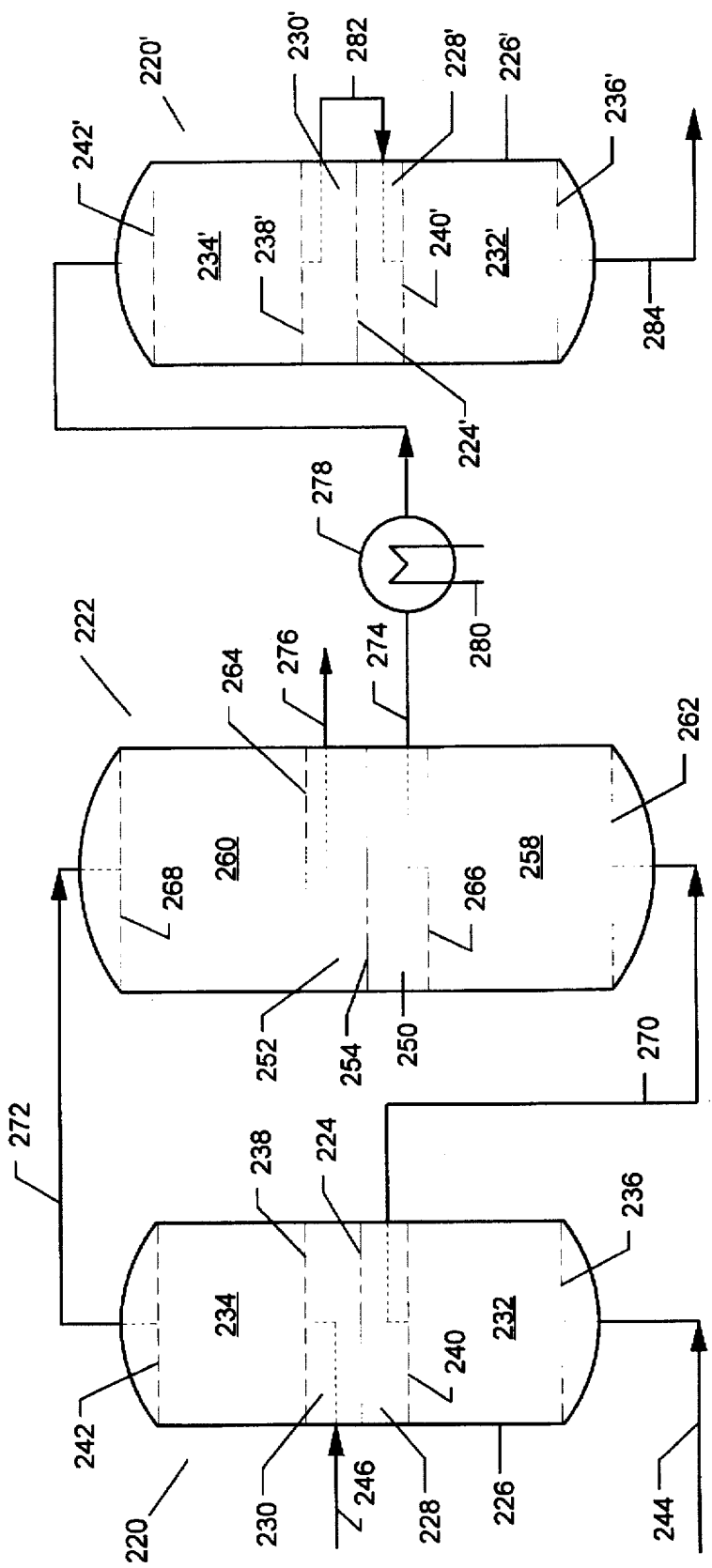
FIG. 4 illustrates apparatus comprising a pair of two-chamber gas drying vessels for carrying out a specific embodiment of the invention.

FIG. 4 illustrates apparatus that is useful for specific applications of the process of the invention. The major equipment units in the FIG. 4 system are vertical two bed dryer vessels 220 and 220', and a vertical two-bed adsorption unit 222. Adsorption vessels 220 and 220' are substantially identical, and in the FIG. 4 system, they are designed to be operated in alternate service with the beds in one of the vessels being in adsorption service while the beds in the other vessel are being regenerated. Vessels 220 and 220' have substantially identical feed and product discharge lines and are connected to vessel 222 in the same manner. The FIG. 4 unit will be described in detail as it is used in connection with a hydrocarbon partial oxidation plant, with the gas drying step in progress in vessel 220 and bed regeneration in progress in vessel 220'; and with adsorption in progress in the lower bed in vessel 222 and bed regeneration in progress in the upper bed of this vessel.

Vessel 220 is provided with a flat circular partition 224 which, in conjunction with sidewall 226, forms lower and upper gas-tight chambers 228 and 230, respectively. Chambers 228 and 230 contain adsorbent beds 232 and 234, respectively. Beds 232 and 234 are supported on flat, rigid screens 236 and 238, respectively, and they are held in place by optional flat upper screens 240 and 242. Similarly, vessel 220' is provided with a flat circular partition 224' which, in conjunction with vessel sidewall 226', forms lower and upper gas-tight chambers 228' and 230', respectively. Chambers 228' and 230' contain adsorbent beds 232' and 234', respectively. Beds 232' and 234' are supported on flat, rigid screens 236' and 238', respectively, and they are held in place by flat upper screens 240' and 242'.

Hydrocarbon-containing feed gas line 244 is connected to a gas distributor (not shown) positioned in the lower part of chamber 228, just below bed 232, and feed air line 246 is connected to a gas distributor (not shown) positioned in the lower part of chamber 230, just below bed 234.

Vessel 222 is divided into lower and upper gas-tight chambers 250 and 252 by flat circular partition 254 which, in conjunction with the sidewall of vessel 222 forms a gas-tight barrier between the two chambers. Chambers 250 and 252 contain adsorbent beds 258 and 260, respectively. Beds 258 and 260 are supported on flat, rigid screens 262 and 264, respectively, and they are respectively held in place by optional flat upper screens 266 and 268.

Dry hydrocarbon-containing gas line 270 is connected to a gas distributor (not shown) positioned in the lower end of chamber 250 in vessel 222 just below bed 258 and dry air line 272 is connected to a gas distributor (not shown) in the top end of chamber 252 just above bed 260. Waste gas discharge line 274 is connected to a distributor (not shown) in the top of chamber 250, above bed 258, and desorbed hydrocarbon product gas line 276 is connected to a gas distributor (not shown) in the lower part of chamber 252, just below bed 260.

Waste gas discharge line 274, passes through heater 278, in which a source of energy, such as steam or electrical resistance, provides heat through element 280, and then enters the upper end of chamber 230' of vessel 220' through a gas distributor (not shown), positioned just above bed 234'. Gas line 282 collects gas from a distributor (not shown) in the lower end of chamber 230' and delivers it to a distributor (not shown) in the upper part of chamber 228'. Finally, vent gas line 284 collects the cooled waste gas from a gas distributor (not shown) in the lower end of chamber 228', positioned just below bed 232', and discharges it to downstream waste gas disposal means.

The process of the invention as practiced in the system of FIG. 1 will be described as it applies to the separation of the components of a two-component gas mixture on a continuous basis, with adsorption chambers 10 and 12 being operated 180° out of phase, with the adsorbent in one chamber in adsorption service while the adsorbent in the other chamber is being regenerated. In the first half-cycle of the process bed 16 is in adsorption service and bed 18 is being regenerated. In this half-cycle, the filled valves are open and the untilled valves are closed. In the second half-cycle of the process, bed 18 is in adsorption service and bed 16 is being regenerated, and the untilled valves are open and the filled valves are closed.

During the first half-cycle of the process, feed gas enters the system through line 28, and flows through valve 34 and into chamber 10 via gas distributor 38. The feed gas passes upwardly through bed 16, and as it does so, the more strongly adsorbed components are retained in the bed as adsorbed components, and most of the less strongly adsorbed components pass through the bed as nonadsorbed components. The nonadsorbed components pass out of chamber 10 through distributor 48, line 52 and line 56. Meanwhile, a purge gas enters the upper part of the system through line 62, passes through valve 70 and line 54 and enters chamber 12 through gas distributor 50. The gas then passes through bed 18, and as it does so, it desorbs gas which was adsorbed in the pervious half-cycle of the process. The purge gas, together with the desorbed gas component, passes out of chamber 12 via distributor 40, valve 46 and line 42.

When the adsorbed gas front reaches a predetermined level in bed 10, the first half-cycle is terminated and the second half-cycle is begun. To effect this changeover all of the untilled valves are opened and all of the filled valves are closed. The gas flow-scheme then reverses, and adsorption begins to take place in bed 12 and regeneration of bed 10 begins. The above cycle is continuously repeated for the duration of the adsorption run.

The process can be carried out at any desired temperature and pressure conditions, provided that the above-mentioned temperature and pressure differential constraints are maintained. Under the constraints, the adsorption and bed regenerating temperature differential and the adsorption and bed regenerating pressure differential will be less than the limiting values. In the most preferred aspect of the FIG. 1 embodiment of the invention the process is carried out under CSA conditions. By the term "CSA conditions" is meant that bed regeneration is carried using a purge gas, and that at all times during the adsorption process the temperature and pressure in one of the two adsorption chambers are substantially the same as the temperature and pressure, respectively, in the other chamber. For purposes of this invention, "substantially the same", with respect to the pressures and temperatures in adjacent adsorption chambers, means that the pressure in one of the two chambers is always within about 0.5 bar of the pressure in the other chamber, and that the temperature in one chamber is always within 25° C. of the temperature in the other chamber. In the most preferred embodiment, the pressure differential during each step of the process is not more than 0.25 bar and the temperature differential during each step is not more than 10° C.

The process of the invention, as carried out in the apparatus of FIG. 2 is, in general, the same as the process carried out in the apparatus of FIG. 1. However, because the ends of adsorption chambers 10' and 12' located opposite partition 14 are parallel to partition 14, a more uniform flow of gas through these chambers will be effected both during the adsorption phase and the bed regeneration phase of the process. Furthermore, the purge gas-desorbed gas mixtures leaving chambers 10' and 12' pass through valves 90 and 94, respectively, and flow into one or both of buffer compartments 84 and 86. This provides a more regular flow of desorbed gas from vessel 2' to downstream applications. In the apparatus of FIG. 2, compartment 84 can be used solely to buffer the flow of purge gas-desorbed gas mixture from chamber 10' and compartment 86 can be used to solely buffer the flow of mixture from chamber 12', or by opening valve 98, both of compartments 84 and 86 can be used to buffer gas mixtures from chambers 10' and 12'.

As was the case with the FIG. 1 system, the process can be carried out at any desired temperature and pressure conditions, provided that the above-mentioned temperature and pressure differential constraints are maintained. Again, in the process of the invention as practiced in the system of FIG. 2, it is preferred to conduct the adsorption and bed regeneration steps under CSA conditions.

The process of the invention carried out in the apparatus of FIG. 3 is similar to the process carried out in FIGS. 1 and 2, but it has certain important distinctions. In the first place the left side adsorption system is independent of the right side adsorption system. Because of this, the feed gases introduced into chambers 10' and 12' of the FIG. 3 system can be the same or different. Furthermore, the adsorbent in chamber 10' can be different from the adsorbent in chamber 12'. Because of this, the two beds can also be used to adsorb different gases from the same multicomponent gas mixture, either by simultaneously passing the same feed gas through both beds of adsorbent in parallel flow, or by passing a gas mixture first through one bed of adsorbent and then through the second bed of adsorbent.

A second distinction between processes carried out in the system of FIG. 3 and those carried out in the systems of FIGS. 1 and 2 is that the FIG. 3 process can be practiced with adsorption being simultaneously carried out in each bed and bed regeneration being simultaneously carried out in each bed. Because of this, the adsorption process carried out in the FIG. 3 system can be any one of PSA, TSA, or CSA, or combinations of these. It is important, however, that the pressure and temperature constraints mentioned above be adhered to. Thus, the process can be carried out by PSA over a wide range of pressures, and by TSA over a wide range of temperatures, so long as the processes in the two chambers are conducted under substantially the same conditions, as this term is defined above.

In the system of FIG. 3, the adsorption process can also be practiced with the two beds operated out of phase, i.e. with one bed in adsorption service while the other is being regenerated, and vice versa, provided that the process is carried out under CSA conditions in the manner described above. In this embodiment, the same gas can be processed in both adsorption chambers, or different gases can be processed simultaneously in the two chambers.

Although the system of FIG. 3, as illustrated, is substantially identical to the FIG. 2 system, except for piping and valving modifications, the piping and valving arrangements shown in FIG. 3, and the processes described above with respect to FIG. 3, can be applied to the system illustrated in FIG. 1. In other words, the process embodiment of the invention in which two different feed streams are treated simultaneously can be carried out using the vessel illustrated in FIG. 1 with the piping and valving modifications illustrated in FIG. 3. Furthermore, the processes described in connection with the FIG. 3 system can be practiced using a vertical vessel, such as one of those illustrated in FIG. 4. Also the invention can be carried out with pairs of similar or dissimilar two-chamber vessels, also as illustrated in FIG. 4.

The process of the invention, as practiced in the system of FIG. 4 will be described as it applies to the recovery of a hydrocarbon from a partial oxidation reactor off-gas. In addition to the hydrocarbon adsorption system illustrated in FIG. 4, the partial oxidation plant includes, among other units, a hydrocarbon partial oxidation reactor and a petrochemical product recovery unit. Hydrocarbon and oxygen are reacted in the partial oxidation reactor to produce a gas stream containing the desired petrochemical product, carbon oxides and unreacted hydrocarbon. The gas stream exits the partial oxidation reactor and next passes through the product recovery unit, which, typically, is a scrubber, which scrubs petrochemical product from the gas stream. The petrochemical-free gas stream then flows to the hydrocarbon adsorption plant for recovery of hydrocarbon. The hydrocarbon, together with the air or oxygen-enriched air that is used to purge the hydrocarbon from the adsorbent, is recycled to the partial oxidation reactor.

The hydrocarbon-adsorption system used in the FIG. 4 system comprises a battery of two substantially identical cylindrical dryer vessels, 220, 220', each containing a pair of moisture-selective beds of adsorbent that are separated by a substantially flat partition wall, and a hydrocarbon adsorption vessel, 222, comprising a pair of adsorption chambers separated by a substantially flat, gas-impervious partition, each chamber containing a bed of hydrocarbon-selective adsorbent. The dryer beds are preferably operated on TSA cycles and the hydrocarbon adsorption beds are preferably operated on a CSA cycle.

In the half-cycle currently in progress in the system of FIG. 4, the beds of vessel 220 are in adsorption service and the beds of vessel 220' are undergoing bed regeneration. Bed 232 of vessel 220 is in service drying hydrocarbon-containing gas, and bed 234 is in air-drying service. Vessel 222 is a hydrocarbon adsorption unit. Beds 258 and 260 contain hydrocarbon-selective adsorbent and they are operated out of phase, such that one unit is in adsorption service adsorbing hydrocarbon from the reactor off-gas, while the other unit is undergoing regeneration to desorb adsorbed hydrocarbon from the bed. During the adsorption half-cycle currently in progress in vessel 222, bed 258 is in hydrocarbon adsorption service and bed 260 is being regenerated.

Operation of the gas-drying and hydrocarbon adsorption systems is cyclical. A partial cycle (half-cycle) occurs when one bed has undergone all of the steps in the adsorption process, and a full cycle occurs when each bed of the adsorption system has undergone a partial adsorption cycle. In the complete adsorption process full cycles are repeatedly carried out, so that the process is substantially continuous.

In operation of the FIG. 4 system, hydrocarbon-containing off-gas from the petrochemical recovery unit (not shown) is introduced into the lower part of chamber 228 via line 244. The off-gas passes upwardly through moisture-selective adsorbent bed 232 and, as it does so, moisture is selectively adsorbed from the off-gas. Any suitable moisture-selective adsorbent, such as zeolite 3A, alumina, etc., can be used in the dryers. In the most preferred embodiment of the invention, the drying adsorbent is zeolite 3A. This adsorbent is especially suitable for use in the gas drying steps of the invention because it readily adsorbs moisture from the gas streams being dried in the process, without adsorbing other components of the gas streams. The dry hydrocarbon-containing off gas passes out of chamber 228 through line 270. Meanwhile, atmospheric air enters the lower part of chamber 230 and passes upwardly through moisture-selective adsorbent bed 234, wherein the air is dried. The dry air leaves chamber 230 through line 272. The adsorption step is continued until the moisture front in one or both adsorbers reaches a selected point near the top of the bed(s), the selected point being short of the point at which breakthrough of moisture from the adsorbent(s) occurs. The adsorption step is then terminated.

The drying step taking place in beds 232 and 234 may be carried out at any desired temperature and pressure, provided that the temperature and pressure differentials between adsorption chambers 228 and 230 do not exceed the limiting values specified above. In the preferred embodiment the temperatures and pressures in the two chambers are respectively substantially the same, as defined above. The gas drying steps are generally conducted at a temperature in the range of about 5° to about 60° C. and are preferably conducted at a temperature in the range of about 25° to about 40° C.

The dry hydrocarbon-containing off-gas passing through line 270 enters the bottom of chamber 250 of vessel 222, and passes upwardly through hydrocarbon-selective adsorbent bed 258. The hydrocarbon-selective adsorbent can be any of the well-known adsorbents that adsorb gaseous hydrocarbons more strongly than they do adsorb carbon oxides, nitrogen, oxygen, etc. Suitable adsorbents include silica gel, activated carbon, molecular sieves, such as natural zeolites, including faujasite, mordenite, erionite, etc., and synthetic zeolites, including 4A, 5A, 10X, 13X zeolites, etc. The preferred adsorbents are silica gel, activated carbon, zeolite 5A and zeolite 13X. The particular hydrocarbon-selective adsorbent used in the process of the invention does not constitute a critical part of the invention. As the gas passes through the bed hydrocarbon is adsorbed. The hydrocarbon-depleted off-gas leaves chamber 250 through line 274. Meanwhile, the dry air in line 272 enters the top of chamber 252 and passes downwardly through hydrocarbon-laden adsorbent 260. As the air passes through the bed, it desorbs hydrocarbon-rich gas from the bed. The mixture of hydrocarbon-rich gas and purge air passes out of chamber 252 through line 276, and it is recycled to the hydrocarbon partial oxidation reactor.

As noted above, the adsorption process occurring in vessel 222 is preferably CSA. The adsorption and bed regeneration steps in this vessel are generally carried out at a pressure in the range of about 1.05 to about 1.75 bara. It is preferred to conduct the hydrocarbon adsorption and bed regeneration steps at pressures that render these steps most congruous with other steps of the overall process. The scrubbed gas from the hydrocarbon recovery unit is generally available at pressures up to about 1.4 bara. Operating the hydrocarbon adsorption process at an adsorption pressure in the range of about 1.2 to about 1.75 bara and a bed regeneration pressure in the range of about 0.7 to about 1.75 bara will enable the scrubbed gas stream to pass through the hydrocarbon adsorbers and the dryers that are being regenerated and to reach a downstream incinerator (or other disposal means) without the use of supplemental blowers or compressors. Accordingly, it is preferred to conduct the adsorption and bed regeneration steps at pressures in these ranges.

The temperatures at which adsorption and bed regeneration take place in the beds of vessel 222 are preferably in the range of about −50° to about 150° C., and are most preferably in the range of about 0° to about 60° C. The adsorption is preferably carried out at the temperature which provides optimum separation and which is in harmony with other steps of the product manufacturing process, if possible. The optimum adsorption temperature of the process will depend, inter alia, upon the particular adsorbent being used, the pressure at which the process is carried out and the specific gases being separated. Those skilled in the art can easily determine which operating conditions are best suited for their purposes.

In any event, as mentioned above, the temperature and pressure differentials between beds 258 and 260 must not exceed the limiting values of 25° C. and 0.5 bar, respectively, and preferably are not permitted to exceed the limits of 10° C. and 0.25 bar, respectively.

The adsorption half-cycle taking place in vessel 222 is permitted to continue until the adsorbed hydrocarbon front in bed 258 reaches the desired end point, which is again short of the point in bed 258 at which hydrocarbon gas begins to break through the bed. When the desired end point is reached, the adsorption half-cycle in progress is terminated and the second half-cycle is initiated, with freshly regenerated bed 260 being put into adsorption service and bed 258 entering the bed regeneration step.

The hydrocarbon-depleted off-gas passing out of vessel 222 through line 274 passes through heater 278, wherein it is heated to the temperature at which it is desired to regenerate the beds of adsorbent in vessel 220'. The hot off-gas is then introduced into the top of chamber 230' and passes downwardly through moisture-laden bed 234'. As the off-gas passes through bed 234', it desorbs moisture from the bed and sweeps it out of chamber 230' through line 282. The hot gas next enters the top of chamber 228' and passes downwardly through moisture-laden bed 232', wherein it desorbs additional moisture, if it is not already moisture-saturated. Eventually, the moisture content in both beds reaches the desired low level, and the beds in this vessel are ready to be placed in drying service when the beds in vessel 220 have completed the adsorption half-cycle. The purge gas-moisture leaving vessel 220' can be vented to the atmosphere or used in downstream operations, such as in combustion processes, as desired.

The bed regenerating step taking place in beds 232' and 234' may be carried out at any desired temperature and pressure, provided that the temperature and pressure differentials between adsorption chambers 228' and 230' do not exceed the limiting values specified above. In the preferred embodiment the temperatures and pressures in the two chambers are respectively substantially the same, as defined above. The bed regeneration steps of the gas drying process are generally conducted at a temperature in the range of about 100° to about 250° C. and are preferably conducted at a temperature in the range of about 150° to about 200° C. The bed regenerating step is preferably conducted at pressures in the range of about 1.05 to about 2 bara, and most preferably at pressures in the range of about 1.1 to about 1.75 bara.

It can be appreciated that modifications of the dryer bed regeneration sequence is possible. In one modification, the gas exiting bed 234' can be reheated in line 282 before its passage through bed 232'. In another modification, the heated gas from heater 278 can be simultaneously passed through beds 232' and 234' in parallel flow rather than being passed serially through the beds in the manner described above.

It can be appreciated that, where appropriate, the adsorption cycle may contain steps other than the fundamental steps of adsorption and regeneration. For example, in PSA operations it may be advantageous to depressurize the adsorption bed in multiple steps, with the first depressurization product being used to partially pressurize another bed in the adsorption system. This will further reduce the amount of gaseous impurities in the nonadsorbed product gas. Similarly, in gas drying steps supplemental heat may be added to the beds by heaters.

It will be appreciated that it is within the scope of the present invention to utilize conventional equipment to monitor and automatically regulate the flow of gases within the system so that it can be fully automated to run continuously in an efficient manner.

Although the invention has been described with particular reference to specific equipment arrangements and to specific experiments, these features are merely exemplary of the invention and variations are contemplated. For example, vertical or horizontal vessels can be used in any of the embodiments of the invention. The scope of the invention is limited only by the breadth of the appended claims.

What is claimed is:

1. A cyclic process for separating a first gas from a gas mixture containing said first gas and one or more other gases by concentration swing adsorption in first and second adjacent gas adsorption chambers that are separated by a first planar partition, and each of which contains an adsorbent which more strongly adsorbs said first gas than said one or more other gases comprising repeatedly performing in sequence the steps:

(a) passing the gaseous mixture through said first adsorption chamber at an adsorption pressure in the range of about 1.05 to about 20 bara and an adsorption temperature in the range of about −50° to about 150° C., thereby adsorbing said first gas from said gas mixture and producing a first gas-depleted nonadsorbed stream, while simultaneously passing a purge gas through said second adsorption chamber at a pressure in the range of less than about 1.05 to about 20 bara and a temperature in the range of about −50° to about 150° C., thereby desorbing a first gas-enriched gas stream from the adsorbent contained in said second adsorption chamber, and (b) passing the gaseous mixture through said second adsorption chamber at an adsorption pressure in the range of about 1.05 to about 20 bara and an adsorption temperature in the range of about −50° to about 150° C., thereby adsorbing said first gas from said gas mixture and producing a first gas-depleted nonadsorbed stream, while simultaneously passing a purge gas through said first adsorption chamber at a pressure in the range of less than about 1.05 to about 20 bara and a temperature in the range of about −50° to about 150° C., thereby desorbing a first gas-enriched gas stream from the adsorbent contained in said first adsorption chamber;

the difference in pressure between said first and second adsorption chambers at all times being below that at which stress failure occurs in said first planar partition.

2. The process of claim 1, wherein said difference in pressure between said first and second adsorption chambers does not exceed about 0.5 bar.

3. The process of claim 1 or claim 2, wherein the difference in temperature between said first and second adsorption chambers does not exceed about 25° C.

4. The process of claim 1, wherein said first and second adsorption chambers are longitudinally disposed in a cylindrical vessel.

5. The process of claim 4, wherein the gas mixture passes upwardly through said first adsorption chamber while the purge gas passes downwardly through said second adsorption chamber during step (a) and said gas mixture passes upwardly through said second adsorption chamber while the purge gas passes downwardly through said first adsorption chamber during step (b).

6. The process of claim 4, wherein the gas mixture passes downwardly through said first adsorption chamber while the purge gas passes upwardly through said second adsorption chamber during step (a) and said gas mixture passes downwardly through said second adsorption chamber while the purge gas passes upwardly through said first adsorption chamber during step (b).

7. The process of claim 5 or claim 6, wherein said cylindrical vessel is vertically disposed.

8. The process of claim 5 or claim 6, wherein said cylindrical vessel is horizontally disposed.

9. The process of claim 4, wherein said first planar partition is perpendicular to the longitudinal axis of said cylindrical vessel and forms a continuous gas-tight seal with the sidewall of said cylindrical vessel.

10. The process of claim 9, wherein said vessel is horizontally disposed and the ends of said first and second adsorption chambers opposite said first planar partition are sealed from the ends of said vessel by second and third planar partitions disposed in planes parallel to the plane in which said first planar partition is disposed.

11. The process of claim 10, wherein first gas-enriched gas stream is collected in one or both of a compartment that is at least partially formed by an end wall of said cylindrical vessel and said second planar partition and a compartment that is at least partially formed by an end wall of said cylindrical vessel and said third planar partition.

12. The process of claim 1, wherein said adsorption pressure is in the range of about 1.05 to about 1.75 bara and said difference in pressure between said first and second adsorption chambers does not exceed about 0.25 bar.

13. The process of claim 1, wherein said adsorption temperature is in the range of about 0° to about 60° C., and the difference in temperature between said first and second adsorption chambers does not exceed about 10° C.

14. The process of claim 1, wherein said first gas is a hydrocarbon and said purge gas is air or oxygen-enriched air.

15. The process of claim 14, wherein said purge gas is air.

16. The process of claim 15, wherein said air and hydrocarbon are dried by simultaneously passing these gases through adjacent gas-drying chambers that contain moisture-selective adsorbent and that are longitudinally disposed in a cylindrical vessel and separated by a planer partition which forms a gas-tight seal with the sidewall of said cylindrical vessel, under conditions such that the difference in pressure between said drying chambers and the difference in temperature between said drying chambers do not exceed about 0.5 bar and about 25° C., respectively.

17. The process of claim 16, further comprising simultaneously regenerating the moisture-selective adsorbent in said adjacent gas drying chambers by passing heated hydrocarbon-depleted gas from said first gas adsorption chamber through the moisture-selective adsorbent under conditions such that the difference in pressure between said drying chambers at no time during said gas drying process reaching the difference in pressure at which stress failure occurs in said first planar partition.

18. The process of claim 17, wherein the difference in pressure between said gas drying chambers does not exceed about 0.5 bar at any time during said process.

19. The process of claim 17 wherein the difference in temperature between said gas drying chambers does not exceed about 25° C. at any time during said process.

20. The process of claim 17 carried out by TSA in first and second pairs of adjacent gas drying chambers, wherein the hydrocarbon and air are dried by simultaneously passing these gases through adjacent chambers of the first pair of adjacent gas drying chambers while the adsorbent in the second pair of adjacent gas drying chambers is undergoing regeneration.

21. A cyclic adsorption process for simultaneously separating a first gas from a first gas mixture in a first adsorption chamber which contains an adsorbent which selectively adsorbs said first gas from said first gas mixture, and a second gas from a second gas mixture in a second adsorption chamber which contains an adsorbent which selectively adsorbs said second gas from said second gas mixture, said first and second adsorption chambers being disposed longitudinally relative to each other in a cylindrical vessel and being separated by a first planar partition which, in conjunction with the cylindrical sidewall of the vessel forms a gas-tight barrier between the adsorption chambers, comprising repeatedly performing in sequence the steps:

(a) passing said first gas mixture through said first adsorption chamber at an adsorption pressure in the range of about 1.05 to about 20 bara and at an adsorption temperature in the range of about −50° to about 150° C., thereby adsorbing said first gas and producing a first gas-depleted nonadsorbed gas stream, while simultaneously passing said second gas mixture through said second adsorption chamber at an adsorption pressure in the range of about 1.05 to about 20 bara and at an adsorption temperature in the range of about −50° to about 150° C., thereby adsorbing said second gas and producing a second gas-depleted nonadsorbed gas stream; and (b) regenerating the adsorbent in the first and second adsorption chambers by passing a purge gas through these chambers at a pressure substantially the same as the pressure at which step (a) is carried out, or by simultaneously reducing the pressure in said first and second adsorption chambers, or by simultaneously increasing the temperature in the first and second adsorption chambers, or by a combination of these procedures, thereby desorbing said first gas from the adsorbent in said first adsorption chamber and producing a first gas-enriched gas stream, and simultaneously desorbing said second gas from the adsorbent in said second adsorption chamber and producing a second gas-enriched gas stream;

the difference in pressure between said first and second adsorption chambers at all times during the process being less than that at which stress failure occurs.

22. The process of claim 21, wherein said difference in pressure between said first and second adsorption chambers does not exceed about 0.5 bar.

23. The process of claim 21 or claim 22, wherein the difference in temperature between said first and adsorption chambers does not exceed about 25° C.

24. The process of claim 21, wherein said cylindrical vessel is vertically disposed.

25. The process of claim 21, wherein said cylindrical vessel is horizontally disposed.

26. The process of claim 25, wherein the ends of said first and second adsorption chambers opposite said first planar partition are sealed from the ends of said vessel by second and third planar partitions disposed in planes parallel to the plane in which said first planar partition is disposed.

27. The process of claim 26, wherein first gas-enriched gas stream is collected in one compartment that is at least partially formed by an end wall of said cylindrical vessel and said second planar partition and second gas-enriched gas stream is collected in the other compartment that is at least partially formed by an end wall of said cylindrical vessel and said third planar partition.

28. The process of claim 21, wherein said adsorption pressure in each adsorption chamber is in the range of about 1.05 to about 1.75 bara and the difference in pressure between said first and second adsorption chambers does not exceed about 0.25 bar.

29. The process of claim 21, wherein the adsorption temperature in each adsorption chamber is in the range of about 0° to about 60° C., and the difference in temperature between said first and second adsorption chambers does not exceed about 10° C.

30. The process of claim 21, wherein said first gas mixture and said second gas mixture are substantially identical.

31. Apparatus for separating a strongly adsorbed gas from a weakly adsorbed gas comprising:

(a) a horizontally disposed elongate vessel having a cylindrical sidewall and convex endwalls;

(b) first, second and third planar, circular, gas impermeable partitions positioned within said vessel perpendicularly to the longitudinal axis of said vessel, the perimeters of said partitions being in continuous gas-tight engagement with said side wall, said first and third partitions being proximate opposite ends of said sidewall and said second partition being positioned intermediate said first and third partitions, such that a first right circular cylindrical chamber is formed between said first and second partitions, a second right circular cylindrical chamber is formed between said second and third partitions, a first product gas buffer compartment is formed between said first partition and one of said convex endwalls, and a second product gas buffer compartment is formed between said third partition and the other of said convex endwalls, said first and second right circular cylindrical chambers containing strongly adsorbed gas-selective adsorbent;

(c) first conduit means passing through said sidewall and providing fluid communication between a source of feed gas, said first and second cylindrical chambers and said first and second product gas buffer compartments;

(d) second conduit means passing through said sidewall at a point diametrically opposite the point at which said first conduit passes through said sidewall, and providing fluid communication between said first and second cylindrical chambers, a waste gas disposal means and a source of purge gas;

(e) third conduit means providing fluid communication between said first and second gas product buffers and product gas discharge means;

(f) valve means in said first conduit means for selectively directing the flow of feed gas to said first and second chambers and for selectively directing the flow of sorbate to said first and second product gas buffer compartments; and (g) valve means in said second conduit means for selectively directing the flow of nonadsorbed gas from said first and second chambers to said waste gas disposal means and for selectively directing the flow of purge gas to said first and second chambers.

32. Apparatus for separating a strongly adsorbed gas from a weakly adsorbed gas comprising:

(a) a horizontally disposed elongate vessel having a cylindrical sidewall and convex endwalls;

(b) first, second and third planar, circular, gas impermeable partitions positioned within said vessel perpendicularly to the longitudinal axis of said vessel, the perimeters of said partitions being in continuous gas-tight engagement with said side wall, said first and third partitions being proximate opposite ends of said sidewall and said second partition being positioned intermediate said first and third partitions, such that a first right circular cylindrical chamber is formed between said first and second partitions, a second right circular cylindrical chamber is formed between said second and third partitions, a first product gas buffer compartment is formed between said first partition and one of said convex endwalls, and a second product gas buffer compartment is formed between said third partition and the other of said convex endwalls, said first and second right circular cylindrical chambers containing the same adsorbent or different adsorbents;

(c) first conduit means passing through said sidewall and connecting said first cylindrical chamber with a source of a first feed gas and said first product gas buffer compartment;

(d) second conduit means passing through said sidewall and connecting said second cylindrical chamber with a source of second feed gas and said second product gas buffer compartment;

(e) third conduit means passing through said sidewall at a point diametrically opposite the point at which said first conduit means passes through said sidewall, and connecting said first cylindrical chamber with a first gas discharge conduit and a source of first purge gas;

(f) fourth conduit means passing through said sidewall at a point diametrically opposite the point at which said second conduit passes through said sidewall, and connecting said second cylindrical chamber with a second gas discharge conduit and a source of second purge gas;

(g) conduit means connecting said first and second gas product buffers with product gas discharge means;

(h) valve means associated with said first conduit means for selectively providing fluid communication between said first cylindrical chamber and either said source of first feed gas or said first product gas buffer compartment;

(h) valve means associated with said second conduit means for selectively providing fluid communication between said second cylindrical chamber and either said source of second feed gas or said second product gas buffer compartment;

(i) valve means associated with said third conduit means for selectively providing fluid communication between said first cylindrical chamber and either said first gas discharge conduit or said source of first purge gas; and (j) valve means associated with said fourth conduit means for selectively providing fluid communication between said second cylindrical chamber and either said second gas discharge conduit or said source of second purge gas.

* * * * *